United States Patent [19]
Tecotzky et al.

[11] Patent Number: 5,138,171
[45] Date of Patent: Aug. 11, 1992

[54] PHOTOSTIMULABLE PHOSPHOR AND ITS USE IN RADIOGRAPHY

[75] Inventors: Melvin Tecotzky, Mendham, N.J.; Paul Leblans, Berchem, Belgium

[73] Assignee: AGFA-Gevaert, N.V., Mortsel, Belgium

[21] Appl. No.: 671,961

[22] Filed: Mar. 19, 1991

[51] Int. Cl.$^5$ .................. C09K 11/61; C09K 11/66; G01N 23/04

[52] U.S. Cl. .................. 250/484.1; 250/327.2; 252/301.4 H; 252/301.4 F

[58] Field of Search .................. 252/301.4 H, 301.4 F; 250/327.2, 484.1

[56] References Cited

U.S. PATENT DOCUMENTS

| | | |
|---|---|---|
| 4,128,498 | 12/1978 | Hase et al. .................. 252/301.4 H |
| 4,220,551 | 9/1980 | Fouassier et al. ............ 252/301.4 H |
| 4,689,278 | 8/1987 | Umemoto et al. ........... 252/301.4 H |
| 5,034,607 | 7/1991 | McAllister et al. .......... 252/301.4 F |

FOREIGN PATENT DOCUMENTS

| | | |
|---|---|---|
| 107192 | 5/1984 | European Pat. Off. ...... 252/301.4 H |
| 321804 | 6/1989 | European Pat. Off. ...... 252/301.4 H |

Primary Examiner—Jack Cooper
Attorney, Agent, or Firm—Breiner & Breiner

[57] ABSTRACT

A photostimulable X-ray energy absorbing halosilicate, halogermanate or halo(silicate-germanate) phosphor, characterized in that said phosphor contains as host metal at least one alkaline earth metal, as halogen at least one member selected from the group consisting of Cl, Br and I, as dopant $Eu^{2+}$ and as co-dopant at least one member selected from the group consisting of niobium and tantalum.

20 Claims, 1 Drawing Sheet

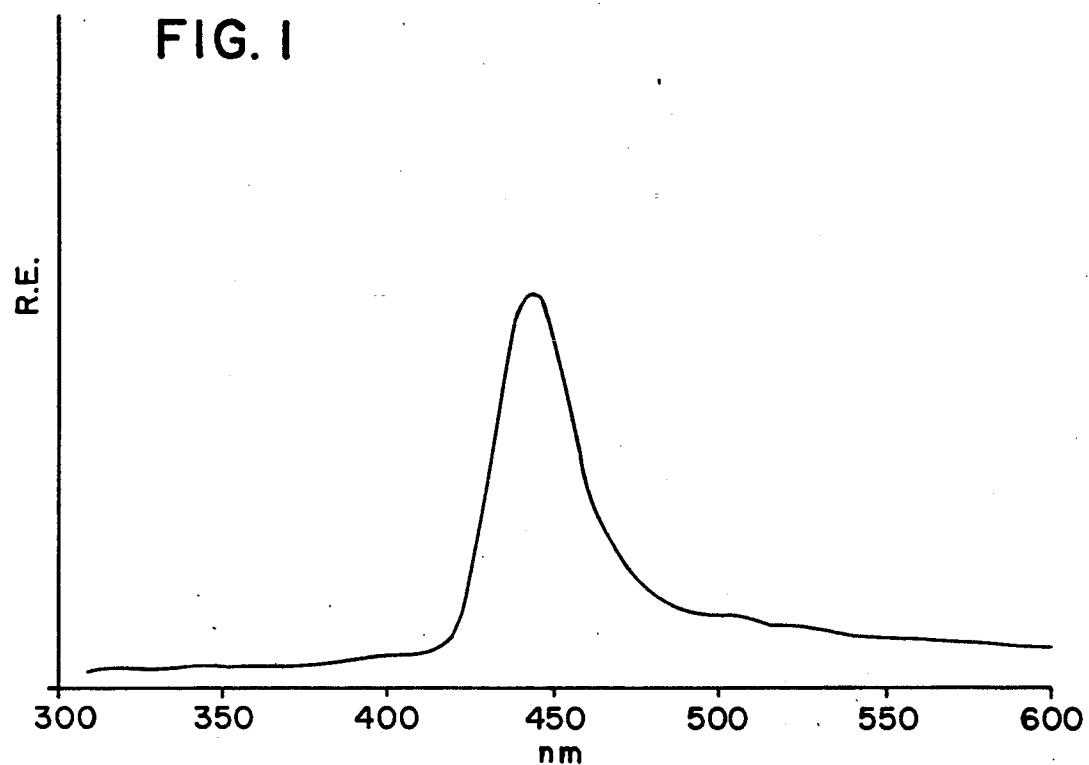
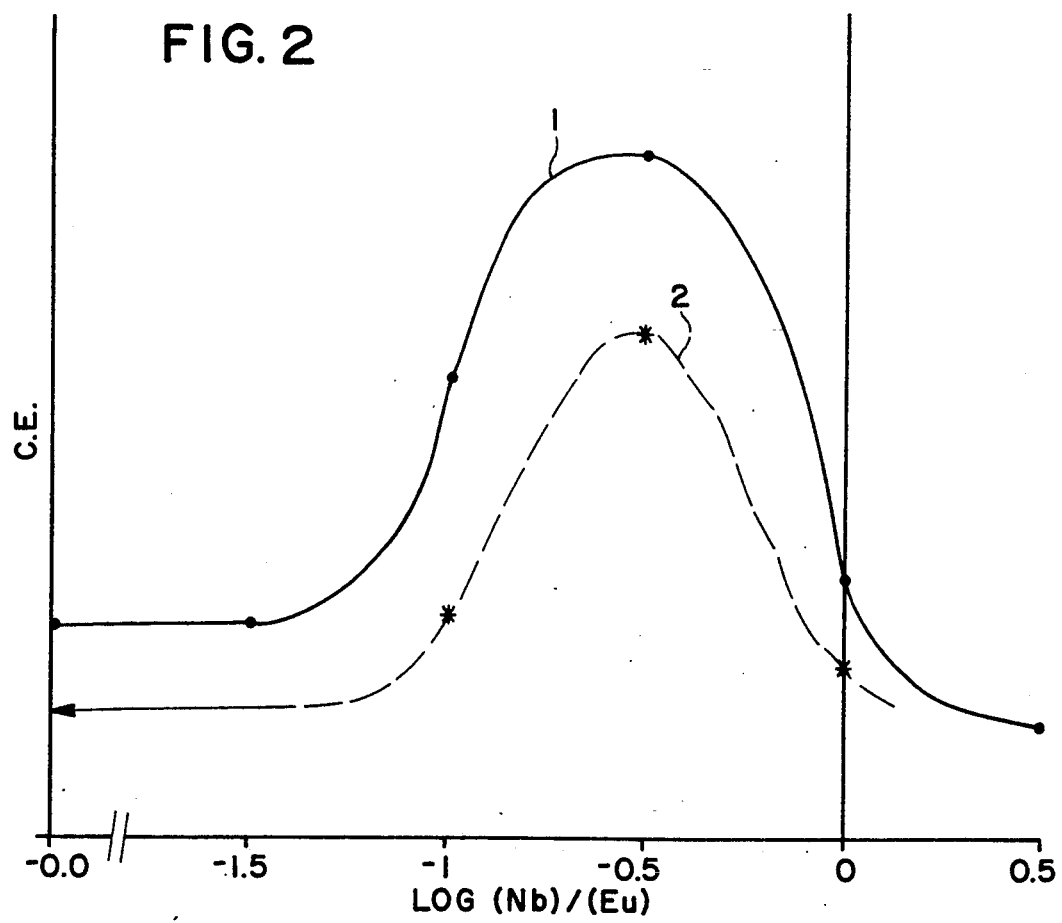

PHOTOSTIMULABLE PHOSPHOR AND ITS USE IN RADIOGRAPHY

DESCRIPTION

1. Field of the Invention

This invention relates to a photostimulable phosphor and to a method of recording and reproducing an X-ray pattern by means of a binder layer containing said phosphor in a screen or panel.

2. Background of the Invention

It is well known that X-rays can cause appropriate substances to luminesce. Substances showing the phenomenon of luminescence under the influence of X-rays are called phosphors.

According to a classical radiographic method photographic silver halide emulsion film is combined with a sheetlike element, called intensifying screen that contains a particulate phosphor distributed in a binder layer to convert X-rays into fluorescent light whereto the film is much more sensitive than to the direct exposure with X-rays.

The phosphors used in said screens should have on X-ray exposure a high prompt emission but not exhibit appreciable long lived emission after the X-ray exposure is switched off.

According to another method of recording and reproducing an X-ray pattern disclosed e.g. in U.S. Pat. Nos. 3,859,527 and 4,258,264 a special type of phosphor is used, known as a photostimulable phosphor, which being incorporated in a panel is exposed to incident pattern-wise modulated X-rays and as a result thereof temporarily stores therein energy stemming from the X-ray radiation pattern. At some interval after the X-ray exposure, a beam of visible or infra-red light scans the panel to stimulate the release of stored energy as light that is detected and converted to sequential electrical signals which are processable to produce a visible image. For this purpose, a stimulable phosphor should store as much as possible of the incident X-ray energy and release as slowly as possible the stored energy until stimulated by the scanning beam. In other words the phosphor should have a high energy storage capacity with slow dark decay. In addition thereto the release of the stored energy on photo-stimulation should proceed efficiently, i.e. almost all the stored energy should be released within reasonable readout times in the form of stimulation light having a wavelength range sufficiently apart from the wavelength range of the stimulating light. In practice the stimulable phosphor should have high sensitivity to stimulating light in the wavelength range of 500 to 700 nm wherein a He-Ne laser (633 nm), ruby laser (694 nm), frequency doubled neodymium YAG laser (532 nm) or argon ion laser (514.5 nm) are emitting. From these commercial lasers the argon ion laser is the most powerful and offers in seqential exposure (scanning) the possibility to shorten the readout time.

The light emitted by stimulating the phosphor, called stimulation light, is situated preferably in the wavelength range of 300 to 500 nm where photomultiplier tubes have high quantum efficiency (ref. the periodical Radiology, Sept. 1983, p. 834) and the stimulation light can be separated efficiently from the stimulating light by means of a proper cut-off filter.

As described in the above mentioned periodical the imaging plate containing a stimulable phosphor can be used repeatedly to store X-ray images simply by flooding it with light to erase the residual energy it contains.

Another important property for a practically useful phosphor is its chemical stability, more particularly its resistance to moisture, since hygroscopic phosphors suffer from loss in luminescence power when becoming wet.

As can be learned from U.S. Pat. No. 4,587,036 some europium-doped alkaline earth fluorohalides (described in EP No. 0 021 342) are sensitive to moisture whereby their fluorescence power is reduced.

In published European patent application No. 0 304 121 $Eu^{2+}$ and/or $Ce^{3+}$ doped (activated) halosilicates are described which are particularly resistant to moisture and have a high conversion efficiency of stored X-ray energy into visible stimulation light on stimulation with argon ion laser light of 514.5 nm.

In published European patent application No. 0 382 295 $Eu^{2+}$ or $Ce^{3+}$ doped (activated) halogermanates and halo(silicate-germanate) phosphors are described which are particularly resistant to moisture and have a high conversion efficiency of stored X-ray energy into visible stimulation light on stimulation with light of wavelength range beyond 600 nm, so for He-Ne laser light of 633 nm.

As is generally known most phosphors contain in their empirical formula structure one or more host metals and a dopant or activator metal in admixture with one or more co-dopants. The host metal gives the phosphor X-ray stopping power and in conjunction with the dopant and co-dopants determines its energy storage capacity, the emission spectrum and the efficiency of the transformation of absorbed X-ray energy into emitted fluorescent light on stimulation being determined mainly by the dopant and optionally present co-dopants.

SUMMARY OF THE INVENTION

It is an object of the present invention to provide new halosilicate, halogermanate and halo(silicate-germanate) compounds that are particularly useful as photostimulable phosphors in a process for recording and reproducing an X-ray image by stimulated emission of stored X-ray energy.

It is more particularly an object of the present invention to provide new halosilicate compounds that are non-hygroscopic and show a very slow dark decay of the absorbed X-ray energy which can be released very efficiently by stimulating light of an argon ion laser emitting at 514.5 nm and/or stimulating light of frequency doubled Nd:YAG laser.

It is another object of the present invention to provide an X-ray screen or panel containing said new phosphor dispersed in a binder layer.

It is a further object of the present invention to provide a process for recording and reproducing a pattern of X-ray radiation wherein said new phosphor is used for storing energy contained in X-ray radiation and said energy is freed again by photostimulation in the form of fluorescent light that is detected.

Other objects and advantages of the present invention will become clear from the following description.

DETAILED DESCRIPTION OF THE INVENTION

In accordance with the present invention a photostimulable X-ray energy absorbing halosilicate, halogermanate or halo(silicate-germanate) phosphor is provided, characterized in that said phosphor contains as host metal at least one alkaline earth metal, as halogen at least one member selected from the group consisting of Cl, Br and I, as dopant $Eu^{2+}$ and as co-dopant at least one member selected from the group consisting of niobium and tantalum.

The term "silicate" applies to chemical compounds including anions consisting of silicon and oxygen, whereas the term "germanate" applies to chemical compounds including anions consisting of germanium and oxygen.

The term "silicate-germanate" applies to chemical compounds including anions consisting of silicon, germanium and oxygen.

Particularly useful phosphors according to the present invention contain as host metal at least one alkaline earth metal selected from the group consisting of Ba, Sr and Ca.

Preferred phosphors according to the present invention are within the scope of of the following empirical formula:

$$Ba_{5-(n+p+q)}Z_qGe_vSi_wO_4X_6:Eu_n^{2+}, D_p^{m+}, M_z$$

wherein:
Z is at least one co-host metal selected from the group consisting of strontium and calcium,
q is in the range of 0 to 0.5,
v is zero or equals at most 1, and v+w=1,
x is bromine and/or chlorine,
n is in the range of 0.0001 to 0.15,
p is in the range of 0 to 0.015,
D is at least one co-dopant selected from the group consisting of $Na^+$, $K^+$ and a rare earth metal ion other than $Eu^{2+}$ and $Ce^{3+}$, e.g. $Y^{3+}$,
m is 1 or 3,
M is niobium and/or tantalum, and
z is in the range of 0.001 to 0.1.

When M is niobium z is preferably in the range of 0.001 to 0.02, and when M is tantalum z is preferably in the range of 0.02 to 0.1.

Other phosphors according to the present invention are within the scope of the following empirical formula:

$$Sr_{5-(n+p+q)}Z_qGe_vSi_wO_4X_6:Eu_n^{2+}, D_p^{m+}, M_z$$

wherein:
Z is at least one co-host metal selected from the group consisting of barium and calcium,
q is in the range of 0 to 0.5,
v is zero or equals at most 1, and v+w=1,
X is bromine and/or chlorine, but preferably bromine,
n is in the range of 0.0001 to 0.15,
p is in the range of 0 to 0.015,
D is at least one co-dopant selected from the group consisting of $Na^+$, $K^+$ and a rare earth metal ion other than $Eu^{2+}$ and $Ce^{3+}$, e.g. $Y^{3+}$,
m is 1 or 3.
M is niobium and/or tantalum, and
z is in the range of 0.001 to 0.1.

Phosphors according to the present invention that are particularly useful in X-ray image reproduction by photostimulation are within the scope of empirical formula (I) or (II):

$$Ba_{5-(n+p)}Ge_vSi_wO_4X_6:Eu_n^{2+}, D_p^{m+}, M_z \quad (I)$$

$$Sr_{5-(n+p)}Ge_vSi_wO_4Br_6:Eu_n^{2+}, D_p^{m+}, M_z \quad (II)$$

wherein:
v is zero or equals at most 1, and v+w=1,
X is bromine and/or chlorine,
n is in the range of 0.0001 to 0.15,
p is in, the range of 0 to 0.015,
D is at least one co-dopant selected from the group consisting of $Na^+$,
$K^+$ and a rare earth metal ion other than $Eu^{2+}$ and $Ce^{3+}$, e.g. $Y^{3+}$,
m is 1 or 3.
M is niobium and/or tantalum, and
z is in the range of 0.001 to 0.1.

Particularly preferred photostimulable phosphors according to the present invention are within the scope of empirical formula (III) or (IV):

$$Ba_{5-n}Ge_vSi_wO_4X_6,Eu_n^{2+}, M_z \quad (III)$$

$$Sr_{5-n}Ge_vSi_wO_4Br_6,Eu_n^{2+}, M_z \quad (IV)$$

wherein
n is in the range from 0.0001 to 0.15,
v is in the range $0 \leq v \leq 1$, v+w being equal to 1
X is bromine and/or chlorine,
M is niobium and/or tantalum, and
z is in the range of 0.001 to 0.1.

Photostimulable phosphors according to the present invention can be prepared by firing at least once $Eu_2O_3$ or $EuF_3$ and $Nb_2O_5$ and/or $Ta_2O_5$ in admixture with (a) host metal halide compound(s), and (a) host metal compound(s) that can be pyrolized into oxide, e.g. carbonates, in admixture with $SiO_2$ (silica) and/or $GeO_2$ for periods of up to 40 hours at temperatures between 450 and 1100° C. $Eu_2O_3$ can be used in admixture with halides and/or oxides of other co-dopants, e.g. $Y_2O_3$ and/or $YF_3$ in the firing stage.

Instead of mechanically mixing the compounds introducing the dopant(s) and co-dopant(s) with the host metal compound(s), the doping element(s) can be chemically co-precipitated with the host metal compounds in the form of a carbonate or oxalate, which can be decomposed by pyrolysis in an appropriate atmosphere, preferably in reducing atmosphere converting $Eu^{3+}$into $Eu^{2+}$. Multiple firing stages are normally advantageous with regard to improved conversion efficiency and lower stimulation energy.

In accordance with the present invention a method for recording and reproducing an X-ray image is provided which method comprises the steps of:

(1) image-wise exposing a photostimulable phosphor to X-ray, (2) photostimulating said phosphor with stimulating electromagnetic radiation selected from visible light and infrared light to release from said phosphor in accordance with the absorbed X-rays electromagnetic radiation different in wavelength characteristic from the radiation used in the photostimulation, and (3) detecting the light emitted by the photostimulation applied in step (2), characterized in that the phosphor subjected to the treatments of said steps (1) and (2) is a halosilicate, halogermanate or halo(-silicate-germanate) phosphor according to the present invention.

The photostimulation proceeds preferably with visible light, e.g. laser light, in the wavelength range of 480 to 560 nm. Preferably photostimulation is carried out with a scanning laser beam of an argon ion laser emitting at 514.5 nm or the laser light of 532 nm of a frequency doubled Nd:YAG laser.

In a practical embodiment before detecting the light emitted by photostimulation the stimulating light is filtered out by one or more optical filters having a high transmission for the light emitted on photostimulation.

The light emitted by photostimulation is detected preferably with a transducer transforming light energy into electrical energy, e.g. a phototube (photomultiplier) providing sequential electrical signals that can be digitized and stored. After storage these signals can be subjected to digital processing. Digital processing includes e.g. image contrast enhancement, spatial frequency enhancement, image subtraction, image addition and contour definition of particular image parts.

According to one embodiment for the reproduction of the recorded X-ray image the optionally processed digital signals are transformed into analog signals that are used to modulate a writing laser beam, e.g. by means of an acousto-optical modulator. The modulated laser beam is then used to scan a photographic material, e.g. silver halide emulsion film whereon the X-ray image optionally in image-processed state is reproduced. For said embodiment and apparatus used therein reference is made e.g. to the periodical Radiology, Sept.1983, p. 833-838.

According to another embodiment the digital signals obtained from the analog-digital conversion of the electrical signals corresponding with the light obtained through photostimulation are displayed on a cathode-ray tube. Before display the signals may be processed by computer. Conventional image processing techniques can be applied to improve the signal-to-noise ratio of the image and enhance the image quality of coarse or fine image features of the radiograph.

For use in said method according to the present invention the photostimulable phosphor is applied preferably in dispersed state in a binder layer that may be supported or self-supporting and forms a screen or panel, called an X-ray image storage panel.

Suitable binders for forming a binder layer incorporating said phosphor in dispersed form are film forming organic polymers, e.g. a cellulose acetate butyrate, polyalkyl (meth)acrylates, e.g. poly(methyl methacrylate), a polyvinyl-n-butyral e.g. as described in the U.S. Pat. No. 3,043,710, a copoly(vinyl acetate/vinyl chloride) and a copoly(acrylonitrile/butadiene/styrene) or a copoly(vinyl chloride/vinyl acetate/vinyl alcohol) or a mixture thereof.

It is preferable that a minimum amount of binder be employed to obtain a high X-ray energy absorption. However, a very small amount of binding agent may result in a too brittle layer, so a compromise has to be made. The coverage of the phosphor is preferably in the range from about 300 to 1500 $g/m^2$.

According to a preferred embodiment the phosphor layer is used as a supported layer on a support sheet. Suitable support materials are made of a film forming organic resin, e.g. polyethylene terephthalate, but paper supports and cardboard supports optionally coated with a resin layer such as an alpha-olefinic resin layer are also particularly useful. Glass and metal supports can also be used. The thickness of the phosphor layer is preferably in the range of 0.05 to 0.5 mm.

For the preparation of the photostimulable phosphor screen the phosphor particles are intimately dispersed in a solution of the binder and then coated on the support and dried. The coating of the present phosphor binder layer may proceed according to any usual technique, e.g. by spraying, dip-coating or doctor blade coating. After coating, the solvent(s) of the coating mixture is (are) removed by evaporation, e.g. by drying in a hot (60° C.) air current.

An ultrasonic treatment can be applied to improve the packing density and to perform the de-aeration of the phosphor-binder combination. Before the optional application of a protective coating the phosphor-binder layer may be calendered to improve the packing density (i.e. the number of grams of phosphor per $cm^3$ of dry coating).

Optionally, a light-reflecting layer is provided between the phosphor-containing layer and its support to enhance the output of light emitted by photostimulation. Such a light-reflecting layer may contain white pigment particles dispersed in a binder, e.g. titanium dioxide particles, or it may be made of a vapour-deposited metal layer, e.g. an aluminium layer, or it may be a coloured pigment layer absorbing stimulating radiation but reflecting the emitted light as described e.g. in U.S. Pat. No. 4,380,702.

Optionally a light-absorbing layer is provided between the phosphor-containing layer and its support or in the support itself to avoid reflection of light at the phosphor-containing layer-support interface and thereby increase the resolution of the photostimulable phosphor screen.

In radiography for industry, e.g. applied in non-destructive testing (NDT) of metal objects, where more energetic X-rays and gamma rays are used than in medical X-ray applications it has been found an advantage to combine the fluorescent phosphor layer in an X-ray intensifying screen with a metal layer or metal support the metal of which has an atomic number in the range of 46 to 83 (ref. U.S. Pat. No. 3,872,309). The metal layer or support acts as an emitter of photo-electrons and secondary X-rays of lower energy that are absorbed in an adjacent phosphor layer at a higher efficiency than the strongly energetic X- and gamma-rays emitted by an industrial X-ray apparatus. Applying that kind of screen structure in industrial stimulation radiography more energy is accumulated in the storage phosphor layer and consequently more energy can be freed lateron by photostimulation.

On phosphor screens containing halosilicate phosphors according to the present invention measurements have been carried out to determine their photo-physical properties.

In a first measurement the "prompt" emission spectrum of the phosphor under X-ray excitation is measured. The measurement proceeds with a spectrofluorimeter in which excitation by X-ray irradiation is carried out with an X-ray source operating at 110 kVp. During continuous X-ray excitation the emitted light is scanned by a monochromator coupled to a photomultiplier. This emission spectrum is identical to that obtained upon photostimulation and is used to determine which filter is to be used in separating the fluorescent emission light from the stimulation light. In the hereinafter described measurements an Ar-ion laser is used to stimulate the present phosphors. In order to separate the stimulation light of the Ar-ion laser from the fluorescent light emitted on stimulation a 2.5 mm Schott BG 3 filter is used whose transmission spectrum is described in Farb- und Filterglas Catalogue No. 3531/4d published by SCHOTT GLASWERKE, Mainz, W-Germany. Since said filter partly absorbs also the fluorescent emission light an attenuation coefficient was determined in order to find total emission power.

In a second measurement the total photostimulable energy ($E_0$) stored upon exposure to a given X-ray dose is determined. Prior to X-ray excitation any residual energy still present in the phosphor screen is removed by irradiation with an argon laser beam (514.5 nm). The phosphor screen is then excited with an X-ray source operating at 85 kVp and 20 mA. For that purpose the MONODOR X-ray source of Siemens AG-W. Germany may be used. The low energy X-rays are filtered out with a 21 mm thick aluminum plate to harden the X-ray spectrum. After X-ray excitation the phosphor screen is transferred in the dark to the measurement set up. In this set up argon ion laser light is used to photostimulate the X-ray irradiated phosphor screen.

Using a pinhole placed behind and in contact with the phosphor screen, the light emitted by an area of only 7 mm$^2$ of the screen is collected. Using the pinhole the intensity of the stimulating beam on the screen area that is read out is more uniform. Only ⅔ of the laser power (37 mW) reaches the screen surface.

The signal amplitude from the photomultiplier is linear with the intensity of the stimulating light and with the stored photostimulable energy.

In order to measure the total amount of stored energy the emission intensity was measured over a very long period. The measuring and analysis procedure described in EP-A 0304 121 was therefore adapted.

If the phosphor contains only one type of electron-trap and if recombination between electron and hole is a process following first order kinetics, the emission-intensity decays exponentially with time under constant stimulation:

$$I(t) = I_0 e^{-t/\tau} \quad (1)$$

where:
I(t) is the emission intensity after a stimulation period of length "t",
$I_0$ is the amplitude of the intensity vs. time signal,
e is the base number of the natural logarithms,
t is the length of the stimulation period,
$\tau$ is a characteristic time related to the stimulating laser intensity P and the characteristics of the phosphor.

The total amount of stored energy, $E_o$, is the area under the intensity vs. time curve:

$$E_o = I_o \int_0^\infty e^{-t/\tau} dt \quad (2)$$

In the measuring and analysis procedure described in EP-A 0 204 121, the emission intensity was measured up to the time when the emission intensity had decreased by a factor 1/e, i.e. up to $t = \tau$. Following eq. (2), the amount of energy emitted at $t = \tau$ is equal to:

$$E(\tau) = \frac{e-1}{e} \cdot E_o \left[ \text{or: } E_o = \frac{e}{e-1} E(\tau) \right] \quad (3)$$

Therefore, the value of $E_o$ can be calculated from the amount of energy emitted up to $t = \tau$, $E(\tau)$. The conversion efficiency, C.E., is then calculated as $E_o$ divided by the excitation Röntgen dose, R.d., and by the volume of the phosphor from which the emitted light is collected (surface times screen thickness).

The stimulation energy of the phosphor, S.E., reflects the ease with which the stored energy can be released with a laser beam with intensity P and wavelength λ. It is related to the laser power P and to the stimulation time $\tau$ needed to make the emission intensity decrease with a factor 1/e:

$$S.E. = \tau \times P \quad (4)$$

The photostimulation energy is expressed in μJ/mm$^2$.

It will be clear that the above definitions of C.E. and S.E. are meaningful only if the phosphor contains a single type of electron trap and if the decay of the emission intensity corresponds to a single exponential course. Such behaviour is thus not followed when in the phosphor electron-traps of different energy depth are filled upon X-ray exposure. The following measuring and analysis procedure has, therefore, been applied:

Instead of determining $E_o$ from $E(\tau)$ following eq. (3), i.e. measuring the emission intensity until it has decreased by a factor 1/e, the emission intensity has been measured over a period of time corresponding with practically complete read-out. For that purpose the I(t)-curve has been determined in two stages. First, a measurement was carried on a shorter time scale (up to about 100 ms) and at such a sensitivity that $I_o$ could be measured accurately. In a second measurement a longer time scale was adopted (up to about 1000 ms) and the sensitivity of the oscilloscope was such that the amplitude of the signal $I_o$ fell beyond the measurement scale, but that the emission intensity at longer stimulation times (longer than 100 ms) could be measured accurately.

For both measurements the intensity was divided by the röntgen dose and subsequently both curves were combined. In this way the emission intensity per röntgen dose (I(t)/R.d.) as a function of time up to 900 ms is obtained.

In order to calculate the conversion efficiency the area under the combined curve was determined. This yields the stored energy per röntgen dose, $E_o$/R.d. The conversion efficiency, C.E., is then obtained as $E_o$/R.d., divided by the volume of phosphor from which emission light is collected upon stimulation:

$$C.E. = E_o/R.d. \times d \times A \quad (5)$$

where:
d = the screen thickness in mm,
A = the area (mm$^2$) from which emission light is collected.

Because the emission light is scattered in all directions only a fraction of the emitted light is detected by the photomultiplier. The positions of the phosphor panel and photomultiplier are such that 10% of the total emission is detected by the photomultiplier. After all corrections have been made a value for X-ray conversion efficiency is obtained in pJ/mm$^3$/mR. This value varies with screen thickness and therefore for measurements to be comparable they have to be carried out at constant phosphor coverage.

In a third measurement the dark decay characteristics of the phosphor samples have been measured. For that purpose the photostimulable energy stored upon exposure to a given X-ray dose was determined one minute after the X-ray exposure and 60 minutes after said exposure. Here, for simplicity, the measuring and analysis procedure described in published EP-A 0 204121 was applied.

Normally the amount of the energy released 60 minutes after the X-ray exposure is lower than the amount of energy released 1 minute after said exposure. However, for the Nb- and/or Ta-doped phosphors according to the present invention an increase in released energy has been measured, probably due to a redistribution of the electrons present in different traps.

The stimulable phosphor screens according to the present invention apart from their use in medical and industrial radiography are likewise useful in autoradiography.

In classical autoradiography a photographic record of radioactive material within an obeject is made by putting the object in contact with a photographic material forming therein directly or through development a record of the radioactive pattern. In autoradiography according to the present invention the radioactive object is placed in contact or close proximity with a stimulable phosphor screen according to the present invention whereby the phosphor stores energy of the radioactive pattern in the object. The stored energy is freed in the form of fluorescent light by photostimulation and the emitted light is detected and used for image storage and reproduction e.g. on photographic material or cathode ray tube.

The present invention is illustrated by the following examples without limiting it thereto.

The ratios, parts and percentages are by weight unless mentioned otherwise.

EXAMPLES 1-5 and COMPARATIVE EXAMPLE 6

Preparation of $Ba_{4.98}Eu_{0.02}SiO_4Br_6:Nb_z$
($6.10^{-4} \leq z \leq 6.10^{-2}$); z represents zero in the comparative example 6.

The following ingredients were weighed out:

| | |
|---|---|
| $BaCO_3.0.47\%\ H_2O$ | 41.6 g |
| $Eu_2O_3.3.33\%\ H_2O$ | 0.3853 g |
| $SiO_2.1.89\%\ H_2O$ | 6.486 g |
| $BaBr_2\ 1.49\%\ H_2O$ | 95.853 g |

Mixing

Said ingredients were mixed and ground in a ball mill with 72 ml of anhydrous ethanol for 15 min. The obtained mixture was placed in an oven and dried at 80° to 90° C. for 120 minutes. Six sample batches of this size were prepared and after drying blended together in a mixer to form a master blend. From that blend 79.95 g were taken and intimately mixed with 0.468 g of $Nb_2O_5$ to form what is called hereinafter the Nb-blend.

Firing

From the Nb-blend 20 g was fired to give the Example 1 material. To obtain lower concentrations of the Nb-codopant, the Nd-blend was diluted with the master blend material not containing $Nb_2O_5$.

For preparing the Example 2 material 6.6670 g of the Nb-blend was mixed with 13.3390 g of the master blend material and fired.

For preparing the Example 3 material 2.0075 g of the Nb-blend was mixed with 18.0004 g of the master blend material and fired.

For preparing the Example 4 material 0.667 g of the Nb-blend was mixed with 19.333 g of the master blend material and fired.

For preparing the Example 5 material 0.206 g of the Nb-blend was mixed with 19.800 g of the master blend material and fired.

For preparing the phosphor material of comparative example 6 20 g of the master blend material were fired in the absence of any $Nb_2O_5$.

All of the thus obtained mixtures were placed in an alumina boat and covered with another boat and placed in a tube furnace. The firing proceeded under the same conditions, viz. firing under a $N_2$ atmosphere for 2 hours at 450° C., whereupon the temperature was raised and firing continued for 2 hours at 800° C. The thus fired samples were removed from the hot furnace and ground in a mortar, whereupon they were fired again for 2 hours at 800° C. this time in an atmosphere of 95/5% by volume of nitrogen/hydrogen. The samples were removed from the hot furnace reground and fired again in said nitrogen/hydrogen atmosphere for 2 hours at 800° C.

After cooling down the samples were reground.

All samples had similar "prompt" emission spectra. The "prompt" emission spectrum corresponding with the spectrum of the light emitted on photostimulation is shown in FIG. 1, wherein the relative light-emission intensity R.E. is plotted against wavelength in nm.

Each thus obtained phosphor powder sample was then dispersed in a binder solution containing polyethyl acrylate dissolved in ethyl acetate. Each obtained dispersion was coated onto a 100 μm thick transparent sheet of polyethylene terephthalate to give a coating weight of 500 g/m2. The screens were then used to determine the energy storage characteristics of their phosphor. After erasing any residual stored energy by exposure to argon laser light (514.5 nm), each screen was irradiated with a given dose of X-rays and then stimulated with Argon ion laser light (514.5 nm) as described hereinbefore.

The conversion efficiency (C.E.) expressed in $pJ/mm^3/mR$ plotted against the logarithm of the ratio of the Nb atom concentration to the Eu atom concentration (log [Nb]/[Eu]) in the phosphors of Examples 1 to 6 is represented in FIG. 2 (curve 1).

The ratio of the conversion efficiency (C.E.) after 60 minutes (60') to the conversion efficiency (C.E.) after 1 minute (1') following the X-ray irradiation of the screen is given in Table 1.

TABLE 1

| Example No. | C.E.(60')/C.E.(1') |
|---|---|
| 1 | 1.04 |
| 2 | 0.84 |
| 3 | 0.98 |
| 4 | 0.71 |
| 5 | 0.81 |
| 6 | 0.20 | tration (log [Nb]/[Eu]) in the phosphors of Examples 11 and 12 is represented in FIG. 2 (curve 2).

The conversion efficiency (C.E.) in pJ/mm$^3$/mR and the ratio of the conversion efficiency (C.E.) after 60 minutes (60') to the conversion efficiency (C.E.) after 1 minute (1') following the X-ray irradiation of the screen is given in Table 3 for the materials of Examples 11 and 12.

TABLE 3

| Example No. | C.E. | C.E.(60')/C.E.(1') |
| --- | --- | --- |
| 11 | 17.3 | 0.35 |
| 12 | 22.0 | 0.79 |

COMPARATIVE EXAMPLE 13 and EXAMPLE 14

Preparation of $Ba_{4.98}Eu_{0.02}GeO_4Br_6$ and $Ba_{4.98}Eu_{0.02}GeO_4Br_6:Nb_{0.006}$ The following ingredients were weighed out:

| | |
| --- | --- |
| $BaCO_3.0.47\% H_2O$ | 26.18 g |
| $Eu_2O_3.3.33\% H_2O$ | 0.242 g |
| $GeO_2.0.29\% H_2O$ | 6.99 g |
| $BaBr_2.12\% H_2O$ | 66.6 g |

Mixing

Said ingredients were mixed in a ball mill with 50 ml of anhydrous ethanol for 15 min. The obtained ground mixture was placed in an oven and dried at 80° to 90° C. for 120 minutes.

Firing

For preparing the phosphor of comparative Example 13 material 20 g of the above mixture of ingredients was fired.

For preparing the Example 14 material 20 g of said mix was intimately mixed with 0.106 g of $Nb_2O_5$.

Of the two thus obtained mixtures 20 g were placed in an alumina boat and covered with another boat and placed in a tube furnace. The firing proceeded under the same conditions, viz. firing under a $N_2$ atmosphere for 2 hours at 450° C., whereupon the temperature was raised and firing continued for 2 hours at 800° C. Each of the thus fired samples was removed from the hot furnace and ground in a mortar, whereupon they were fired again for 2 hours at 800° C. this time in an atmosphere of 95/5% by volume of nitrogen/hydrogen. The samples were removed from the hot furnace reground and fired again in said nitrogen/hydrogen atmosphere for 2 hours at 800° C.

After cooling down the samples were reground.

Each thus obtained phosphor powder sample was then dispersed in a binder solution containing polyethyl acrylate dissolved in ethyl acetate. Each obtained dispersion was coated onto a 100 μm thick transparent sheet of polyethylene terephthalate to give a coating weight of 500 g/m2. The screens were then used to determine the energy storage characteristics of their phosphor. After erasing any residual stored energy by exposure to argon laser light (514.5 nm), each screen was irradiated with a given dose of X-rays and then stimulated with Argon ion laser light (514.5 nm) as described hereinbefore.

The conversion efficiency (C.E.) in pJ/mm$^3$/mR and the ratio of the conversion efficiency (C.E.) after 60 minutes (60') to the conversion efficiency (C.E.) after 1 minute (1') following the X-ray irradiation is given in Table 4.

TABLE 4

| Example No. | C.E. | C.E.(60')/C.E.(1') |
| --- | --- | --- |
| 13 | 4.03 | 0.20 |
| 14 | 50.50 | 0.87 |

We claim:

1. A photostimulable X-ray energy absorbing halosilicate, halogermanate or halo(silicategermanate) phosphor having the empirical formula:

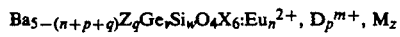

$Ba_{5-(n+p+q)}Z_qGe_vSi_wO_4X_6:Eu_n^{2+}, D_p^{m+}, M_z$ wherein:
Z is at least one co-host metal selected from the group consisting of strontium and calcium,
g is in the range of 0 to 0.5,
v is in the range $0 \leq v \leq 1$, v+w being equal to 1,
X is bromine and/or chlorine,
n is in the range of 0.0001 to 0.15,
p is in the range of 0 to 0.015,
D is at least one co-dopant selected from the group consisting of $Na^+$, $K^+$ and a rare earth metal ion other than $Eu^{2+}$ and $Ce^{3+}$,
m is 1 or 3,
M is niobium and/or tantalum, and
z is in the range of 0.001 to 0.1.

2. A phosphor according to claim 1, wherein M is niobium and z is in the range of 0.001 to 0.02.

3. A phosphor according to claim 1, wherein M is tantalum and z is in the range of 0.02 to 0.1.

4. The phosphor according to claim 1 wherein q is 0.

5. The phosphor according to claim 1 wherein q and p are each equal to 0.

6. A photostimulable X-ray energy absorbing halosilicate, halogermanate or halo(silicategermanate) phosphor having the empirical formula:

$Sr_{5-(n+p+q)}Z_qGe_vSi_wO_4Br_6:Eu_n^{2+}, D_p^{m+}, M_z$ wherein:
Z is at least one co-host metal selected from the group consisting of barium and calcium,
q is in the range of 0 to 0.5,
v is in the range $0 \leq v \leq 1$, v+w being equal to 1,
n is in the range of 0.0001 to 0.15,
p is in the range of 0 to 0.015,
D is at least one co-dopant selected from the group consisting of $Na^+$, $K^+$ and a rare earth metal ion other than $Eu^{2+}$ and $Ce^{3+}$,
m is 1 or 3,
M is niobium and/or tantalum, and
z is in the range of 0.001 to 0.1.

7. The phosphor according to claim 6 wherein q is 0.

8. The phosphor according to claim 6 wherein q and p are each equal to 0.

9. A method for recording and reproducing an X-ray image comprising the steps of:
(1) image-wise exposing a photostimulable phosphor to X-rays,
(2) photostimulating said phosphor with stimulating electromagnetic radiation selected from visible light and infrared light to release from said phosphor in accordance with the absorbed X-rays electromagnetic radiation different in wavelength characteristic from the radiation used in the photostimulation, and (3) detecting the light emitted by the photostimulation applied to step (2), characterized in that said phosphor has the empirical formula:

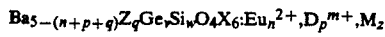

wherein:
Z is at least one co-host metal selected from the group consisting of strontium and calcium,
q is in the range of 0 to 0.5,
v is in the range $0 \leq v \leq 1$, $v+w$ being equal to 1,
X is bromine and/or chlorine,
n is in the range of 0.0001 to 0.15,
p is in the range of 0 to 0.015,
D is at least one co-dopant selected from the group consisting of Na+, K+ and a rare earth metal ion other than $Eu^{2+}$ and $Ce^{3+}$,
m is 1 or 3,
M is niobium and/or tantalum, and
z is in the range of 0.001 to 0.1.

10. A method according to claim 9, wherein M is niobium and z is in the range of 0.001 to 0.02.

11. A method according to claim 9, wherein M is tantalum and z is in the range of 0.02 to 0.1.

12. A method according to claim 9, wherein the photostimulation proceeds with visible light in the wavelength range of 480 to 560 nm.

13. A method according to claim 12, wherein the photostimulation proceeds with the laser beam of an argon ion laser emitting at 514.5 nm or with the 532 nm laser beam of a frequency doubled Nd:YAG laser.

14. A method according to claim 9, wherein before detecting said light emitted by photostimulation the stimulating light is filtered out by one or more optical filters having a high transmission for the light emitted on photostimulation.

15. A method according to claim 9, wherein the light emitted on photostimulation is detected photo-electronically and yields electrical signals that are digitized and stored, are displayed on a cathode-ray tube or are used to modulate a writing laser beam for scanning a photographic material.

16. The method according to claim 9 wherein q equals 0.

17. The method according to claim 9 wherein q and p are equal to 0.

18. A method for recording and reproducing an X-ray image comprising the steps of:
(1) image-wise exposing a photostimulable phosphor to X-rays,
(2) photostimulating said phosphor with stimulating electromagnetic radiation selected from visible light and infrared light to release from said phosphor in accordance with the absorbed X-rays electromagnetic radiation different in wavelength characteristic from the radiation used in the photostimulation, and
(3) detecting the light emitted by the photostimulation applied to step (2), characterized in that said phosphor has the empirical formula:

wherein:
Z is at least one co-host metal selected from the group consisting of barium and calcium,
q is in the range of 0 to 0.5,
v is in the range $0 \leq v \leq 1$, $v+w$ being equal to 1,
n is in the range of 0.0001 to 0.15,
p is in the range of 0 to 0.015,
D is at least one co-dopant selected from the group consisting of Na+, K+ and a rare earth metal ion other than $Eu^{2+}$ and $Ce^{3+}$,
m is 1 or 3,
M is niobium and/or tantalum, and
z is in the range of 0.001 to 0.1.

19. The method according to claim 18 wherein q equals 0.

20. The method according to claim 18 wherein q and p are each equal to 0.

* * * * *